(12) United States Patent
Euhus

(10) Patent No.: US 9,823,648 B2
(45) Date of Patent: *Nov. 21, 2017

(54) METHOD AND APPARATUS FOR AN AUTOMATED CONFIGURATION OF A MONITORING FUNCTION OF AN INDUSTRIAL ROBOT

(71) Applicant: ARTIS GmbH, Egestorf (DE)

(72) Inventor: Dirk Euhus, Neuenkirchen (DE)

(73) Assignee: ARTIS GmbH, Egestorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,593

(22) Filed: Jul. 28, 2014

(65) Prior Publication Data

US 2015/0051726 A1 Feb. 19, 2015

(30) Foreign Application Priority Data

Aug. 14, 2013 (DE) .................. 10 2013 216 136

(51) Int. Cl.
*G05B 19/4097* (2006.01)

(52) U.S. Cl.
CPC ........... *G05B 19/4097* (2013.01); *G05B 2219/32001* (2013.01); *G05B 2219/45064* (2013.01); *Y10S 901/41* (2013.01)

(58) Field of Classification Search
CPC ........... G05B 2219/13004; G05B 2219/13012; G05B 2219/13017; G05B 2219/13022; G05B 2219/13025; G05B 2219/13028; G05B 2219/13068; G05B 2219/13097; G05B 2219/13109; G05B 2219/13155; G05B 2219/13172; G05B 2219/13173; G05B 2219/13174; G05B 2219/13189;
(Continued)

(56) References Cited

U.S. PATENT DOCUMENTS 5,023,800 A * 6/1991 Carver et al. .................. 700/182
5,295,059 A * 3/1994 Brooks et al. .................. 700/18
(Continued)

FOREIGN PATENT DOCUMENTS

DE 10114811 10/2002
DE 10133612 2/2003
(Continued)

OTHER PUBLICATIONS

Computerized Manufacturing Automation: Employment, Education, and the Workplace, Washington, D.C.: U.S. Congress, Office of Technology Assessment, OTA-CIT-235, Apr. 1984, p. 48.*

*Primary Examiner* — Kenneth M Lo
*Assistant Examiner* — Michael J Huntley
(74) *Attorney, Agent, or Firm* — Meyertons Hood Kivlin Kowert & Goetzel, P.C.; Jeffrey C. Hood; Brian E. Moore

(57) ABSTRACT

The invention refers to a method for an automated provision of a monitoring function for a processing process which is to be performed by an industrial robot, wherein the method comprises the following steps: (a) analyzing a computer aided manufacturing (CAM) program of the processing process with respect to processing steps which are to be monitored by means of a post processor; and (b) inserting at least one monitoring instruction which is executed when performing the processing process into a control program of the industrial robot by means of the post processor.

20 Claims, 11 Drawing Sheets

(58) Field of Classification Search
CPC ........... G05B 2219/32001; G05B 2219/45064; G05B 19/4097; G05B 2219/23031; Y10S 901/41
USPC .................................................. 700/103, 175
See application file for complete search history.

(56) References Cited

U.S. PATENT DOCUMENTS

| | | | |
|---|---|---|---|
| 6,799,080 B1* | 9/2004 | Hylden ................ | G05B 19/409 340/3.1 |
| 6,819,960 B1* | 11/2004 | McKelvey et al. ............. | 700/17 |
| 6,862,553 B2 | 3/2005 | Schwenke | |
| 2002/0120921 A1* | 8/2002 | Coburn ............ | G05B 19/41885 717/140 |
| 2003/0023341 A1* | 1/2003 | Sagawa .............. | G05B 19/4093 700/159 |
| 2003/0144753 A1* | 7/2003 | Otani et al. ..................... | 700/87 |
| 2006/0100719 A1* | 5/2006 | Jarrett et al. ................... | 700/28 |
| 2007/0156278 A1* | 7/2007 | Hiraga ................ | G05B 19/406 700/184 |
| 2009/0164038 A1* | 6/2009 | Bretschneider et al. ..... | 700/105 |
| 2010/0150453 A1* | 6/2010 | Ravid et al. .................. | 382/218 |
| 2011/0015771 A1* | 1/2011 | Guo et al. ....................... | 700/97 |

FOREIGN PATENT DOCUMENTS

| | | |
|---|---|---|
| DE | 102004051145 | 4/2006 |
| DE | 102005025338 | 12/2006 |
| DE | 102005047466 | 7/2007 |
| DE | 102007014271 | 10/2007 |
| DE | 102012207916 | 9/2013 |
| EP | 0813130 | 12/1997 |

\* cited by examiner

450

EXPLORER SELECT Toolpath "Toolpath\1" NEW

FORM TOOLPATH

EDIT TOOLPATH "1" RECYCLE

EDIT TPPAGE TPUDS

EDIT USERPAR toolpath '1' NAME "PM_Adaptive_Control"

EDIT USERPAR toolpath '1' TYPE 'Text'

CREATE USERPAR toolpath '1'

EDIT USERPAR toolpath "1" "PM_Adaptive_Control" 'On'

EDIT TOOLPATH "1" REAPPLYFROMGUI

Fig. 5

| Extension | Active control | Quality level | Alarm behaviour |
|---|---|---|---|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

Fig. 10

| Extension | Active control | Quality level | Alarm behaviour |
|---|---|---|---|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

Fig. 11

| Extension | Active control | Quality level | Alarm behaviour |
|---|---|---|---|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

| Extension | Active control | Quality level | Alarm behaviour |
|-----------|---------------|---------------|-----------------|
| 01 | on | low | stop |
| 02 | on | low | no stop |
| 03 | on | low | delayed stop |
| 04 | on | mean | stop |
| 05 | on | mean | no stop |
| 06 | on | mean | delayed stop |
| 07 | on | high | stop |
| 08 | on | high | no stop |
| 09 | on | high | delayed stop |
| 10 | off | low | stop |
| 11 | off | low | no stop |
| 12 | off | low | delayed stop |
| 13 | off | mean | stop |
| 14 | off | mean | no stop |
| 15 | off | mean | delayed stop |
| 16 | off | high | stop |
| 17 | off | high | no stop |
| 18 | off | high | delayed stop |

METHOD AND APPARATUS FOR AN AUTOMATED CONFIGURATION OF A MONITORING FUNCTION OF AN INDUSTRIAL ROBOT

PRIORITY CLAIM

This application claims benefit of priority of German application no. 102013216136.0 titled "Method and Apparatus for an Automated Configuration of a Monitoring Function of an Industrial Robot", filed Aug. 14, 2013, and whose inventor is Dirk Euhus.

INCORPORATED BY REFERENCE

This application claims benefit of priority of German application no. 102013216136.0 titled "Method and Apparatus for an Automated Configuration of a Monitoring Function of an Industrial Robot", filed Aug. 14, 2013, and whose inventor is Dirk Euhus.

TECHNICAL FIELD

The present invention refers to a method and an apparatus for an automated configuration of a monitoring function for an industrial robot.

DESCRIPTION OF THE RELATED ART

Nowadays high requirements are put on the profitability and the productivity of production plans. On the other hand, the produced work pieces have to have a high quality. Furthermore, the variety of the work pieces steadily increases and their mean batch size decreases. These conflicting objectives can only be achieved via a high level of automation.

Presently, machine tools are still key elements in many production plants. Due to their set-ups in form of a machine frame which absorbs occurring processing forces, machine tools are able to process work pieces with highest precision and high speed. The processing precision or the precision of cutting machine tools depends on the machine type and reaches into the range of some micrometers. Ultra high precision machines reach the one digit nanometer range. The price for the precision is high cost on the one hand, and, on the other hand, an inherent inflexibility when applying machine tools.

Originally, industrial robots (IR) have been designed as handling devices, i.e. as the devices which can bring a work piece in a defined position within the space and/or can keep the work piece in this position, or can perform a defined movement with the work piece in order to perform a specific task. Regarding the hardware side, an IR has at least two characteristic components which distinguish the IR from a machine tool: (a) on the one hand, a robot arm or a manipulator which consists of a series of rigid members which are connected by rotary joints or sliding joints, and on the other hand (b) an effector or a hand. The manipulator often has five or six rotational axes or translation axes, and thus can bring the effector in any position within the working space. The effector establishes a connection between a work piece or a tool and an IR. It is the task of the industrial robot to suitably guide the effector within the space. If an IR processes a work piece by means of a tool, the effector contains a tool handling system or a tool holder system. It is also possible that the effector of an IR moves a work piece relative to a stationary tool.

Due to bearings of the robot arms connected in series, the bearing clearances of a manipulator of an IR add to minimal path deviations. Moreover, the clamping of the processing tools or the work pieces also has tolerances.

Due to their designs, IRs are flexibly applicable and can scope with a large tool variety and work piece variety. However, up to now the precision of the tool handling by industrial robots has often not been sufficient for the processing of work pieces. In the meantime, certain industrial robots have however reached a processing precision, in particular by a specific rigidity design which is in the range of some tenths of a millimeter. Thus, IRs are now more and more able to perform simple cutting tasks or pre and/or post processing steps for the work piece processing.

However, an automated production by means of industrial robots can lead to a large scrap rate when an error occurs within short periods, if the error is not recognized in due course. Therefore, it is necessary to monitor an automated operation of an IR by sensor systems in real time, in order to react fast and adequately when an error occurs. Moreover, the condition of the tool which is used for processing a work piece has a significant influence on the quality of the work piece to be fabricated. Furthermore, the probability for the breakage of a tool strongly increases for an excessively worn tool. If a broken tool is not recognized in time in automated production facilities which use industrial robots, this can lead to high scrape rates. In the worst case, defective work pieces or components are installed in an end product which can cause high damages on the customer side.

The same applies if incorrect work pieces are not recognized in time, and are thus processed in the subsequent production line. These work pieces have to be scrapped at the end of the processing, or they are erroneously installed in an end product. Thus, it is very important to recognize such error sources in time and to remove such error sources.

In the field of machine tools, there are presently already a number of systems and apparatuses available for tool monitoring. These systems are based on the direct or indirect measurement of the power consumed in the cutting process. For example, sensors can be used for an indirect measurement of the torque for tool monitoring on the basis of piezo quartzes arranged on the tool, as for example explained in the published patent application DE 29 06 892. The patent DE 10 2006 030 834 A1 and the published patent application DE 10 2004 051 145 A1 of the applicant describe how signals which are determined from various sensors arranged on the spindle of the machine tool can wirelessly be transmitted to a stationary receiving unit.

Advanced CNC (computerized numerical control) or NC (numerical control) machines have a PLC (programmable logic controller) or an adaptive control.

Industrial robots have a robot control which can comprise a complex programming environment. At the moment, no systems or apparatuses for tool monitoring of industrial robots are available. In a production environment the robot control is often connected to a SPS. The SPS controls the interaction of the IR with the surrounding industrial manufacturing equipment. In order to use industrial robots as processing machines, it is therefore useful to design industrial robots that they execute a control program in form of an NC and to operate them as CNC IR in a manufacturing environment.

Advanced industrial robots which are used for monitoring tools and/or processes have powerful interfaces to transmit instructions and data from the monitoring system to the IR.

A monitoring system communicates with an industrial robot directly or by means of a SPS and transmits a portion of the control instruction set via these interfaces to the control of the IR. A second portion of the control commands of the monitoring system is specific to the monitoring system, and thus it is not known to the control of the industrial robot. Finally, a third portion of the control commands depends on the process to be executed by the industrial robot and/or is dependent on the work piece to be processed.

Therefore, the operating staff responsible for the IR (i.e. the machine operator or the work planner) has to insert additional control commands or control instructions in a control program of the industrial robot in order to adapt the monitoring system to the respective processing process. This may result in a significant adaptation effort of the respective control program and is very complex or even not possible in particular for long control programs. This leads to the result that the operating staff often not correctly adapts the monitoring system of the IR to the processing process to be performed. Thus, the monitoring system is often operated in a wrong mode and/or in a mode of reduced functionality. The above mentioned trend of increasing part variety and the tendency to longer control programs additionally increases the discussed problem.

The present invention is therefore based on the problem to provide a method and an apparatus which can be used to optimally adjust a monitoring function to a processing process which is to be performed by an industrial robot in a production environment.

SUMMARY OF THE INVENTION

According to a first aspect of the invention this problem is solved by a method according to patent claim 1. In an embodiment, a method for an automated provision of a monitoring function for a processing process to be performed by an industrial robot comprises the following steps: (a) analyzing a computer aided manufacturing (CAM) program of the processing process with respect to processing steps to be monitored by means of a post processor; and (b) inserting at least one monitoring instruction which is executed when performing the processing process into a control program of the industrial robot by mean of the post processor.

The inventive method avoids setting a monitoring function or a monitoring system of an industrial robot for a specific processing process in the manufacturing environment. Rather, the setting of the monitoring function takes place in a CAM environment. A CAM system produces a CAM program from a three-dimensional model of the work piece which describes all processing steps necessary for the fabrication of the work piece from a blank. The processing process of the work piece is once completely reflected in the CAM environment. The invention enables to analyze the individual steps of the monitoring of the processing process parallel to the analysis of the paths and the velocities of the individual tools in the CAM environment. As a consequence of the identified critical processing steps of the processing process, the monitoring system of the industrial robot can be carefully adapted to the critical steps of the processing process.

Moreover, the inventive method defines a largely automated set-up process for a monitoring function of a processing process which is executed by an industrial robot. This secures that human errors can influence the set-up process of the monitoring function or of a monitoring system as little as possible.

However, the invention does not exclude an additional manual insertion, modification or deletion of one or several monitoring instructions at the industrial robot itself.

A further aspect comprises arranging the post processor in the CAM system.

As already explained above, a CAM system is the preferred environment to perform settings of the monitoring system for a latter production process. If a control program for the IR already exists, it is however also possible to subsequently automatically insert the monitoring instructions into the available control program of the industrial robot or in another correspondingly prepared computer system.

According to a further aspect, the control program comprises a numerical control (NC) program which is generated by the post processor in the CAM system.

It is presently preferred to insert a control program in an industrial robot in form of a computerized numerical control (CNC) program (or briefly a NC program). However, presently only a few industrial robots have a control program in form of an NC program. However, the above described method is not restricted to a specific programming language or to a specific programming environment of the industrial robot. This holds for both the CAM program and the control program of the IR.

In a further aspect analyzing the control program comprises executing at least one analysis script by the post processor.

Scripts are suitable tools to search a CAM according to predetermined criteria or conditions in an automated manner.

According to a further aspect, when analyzing a CAM program the post processor analyzes the extensions of tool paths of the CAM program and/or user defined settings available in the tool paths of the CAM program.

The instructions for an automated provision of a monitoring function can be available in a CAM program in different manners. For example, these instructions can be added to headlines of program parts of the CAM program which define tool paths in the form of extensions. In another example, these instructions are added to program parts of the CAM program which describe tool paths in the form of own declarations as user defined settings.

In a preferred aspect, the extensions of the tool paths of the CAM program and/or user defined settings available in the tool paths of the CAM program refers to an operation mode of the monitoring system and/or refer to a quality setting of the monitoring system and/or refer to generating an alarm event.

According to a further aspect, the operation mode activates or deactivates the monitoring system. According to another aspect, the operating mode activates or deactivates a passive monitoring mode or an active adaptive monitoring mode.

Apart from the monitoring of the processing step, it is the primary objective of the monitoring system to optimize the cycle time of the processing process in an active adaptive monitoring mode. In a passive monitoring mode, the monitoring system primarily or exclusively optimizes the quality control of the processing process.

According to still another aspect, the quality setting comprises several quality levels, in particular a low quality level, a mean quality level and a high quality level. According to a further aspect, the alarm event comprises an immediate stop of the industrial robot, a delayed stop of the industrial robot and/or no stop of the industrial robot. In another aspect, generating the alarm event comprises transmitting the alarm event from the monitoring system to the industrial robot.

In an application example, the extensions of the tool paths of the CAM program and/or user defined settings available in the tool paths of CAM program comprise manufacturing specifications and/or parameter values for determining at least one setting of the monitoring system.

In the aspects explained up to now, the monitoring system obtains its settings by means of the monitoring instructions in the control program of the industrial robot, and simply executes these instructions. In the aspect described in the previous paragraph, the monitoring system is however instructed to determine its settings from provided parameter values and/or from manufacturing specifications. Furthermore, the extensions can be added to the tool paths or the program lines of the CAM program when generating the CAM program from the CAD data. According to a further aspect, the control commands or instructions for the monitoring system are added to the CAM program as user defined settings available in the tool paths of the CAM program when generating the CAM program.

As already explained above, all processing steps to be executed at the work piece are analyzed when generating the CAM program. Therefore, it is beneficial to simultaneously determine the function of the monitoring system for the respective processing steps when analyzing the processing step for the manufacturing process of the work piece. Thus, an optimal synchronization of the processing process and the monitoring function can be secured.

According to another aspect, the extensions of the tool paths and/or the user defined settings available in the tool path of the CAM program are selected from a first library.

There are several possibilities to insert the instructions for setting the monitoring system in a CAM program. It is possible to store the settings of the monitoring system in a library belonging to the various extensions. Apart from the path movements of the tools, the specifications of the production process are also analyzed when generating the CAM program. The appropriate extension and/or user defined setting is selected from the first library, and it is added as an extension of the program portion which describes the corresponding tool path, or it is inserted as a separate program line(s) in the respective tool path of the CAM program.

In a further preferred aspect, the application range of the work piece to be fabricated restricts the selection of the extensions and/or the user defined settings from the first library.

Depending on the field of application or the application field of the work piece (for example medical domain, automobile domain or aerospace technology), there are different production specifications for its manufacturing process. These specifications can be deposited in the first library and lead to a consideration of the respective production specifications by the industrial robot and the associated monitoring system via a respective selection of the extensions or the user defined settings.

According to still another beneficial aspect the processing method and/or a tool restricts the selection of the extensions and/or the user defined settings from the first library.

Different kinds of processing, as for example deburring, grinding, polishing, boring, or milling have different requirements to the functionality of the monitoring system. These requirements can also be deposited in the first library and can be communicated to the monitoring system of the industrial robot by selecting a respective extension for a tool path of the CAM program and/or by user defined settings available in a tool path of the CAM program.

According to a further aspect, the process progress within a processing step restricts selecting the extensions and/or selecting the user defined settings from the first library.

A processing step of a processing process is often executed in several subsequent partial steps, as for example, a roughing operation and a subsequent fine machining. The requirements to a monitoring function are different for the two partial steps. As described above, the various requirements are also deposited in a library.

According to still another aspect, the extensions and/or the user defined settings of the CAM program are automatically generated or manually added.

As already explained above, an extension and/or a user defined setting can be selected from a first library and can automatically be added to a corresponding tool path of a CAM program as an extension, or the user defined setting can be added to the CAM program as a separate program line.

Alternatively, the person which monitors the generation of the CAM program or performs the generation of the CAM program himself can manually insert the extensions and/or the user defined settings for setting the monitoring system in the generated tool path of the CAM program. In doing so, the person can use the above described library and/or his expert knowledge. Moreover, it is also possible that a portion of the extensions and/or the user defined settings can automatically be inserted in the CAM program when it is generated and another portion can manually be added afterwards.

In still another aspect inserting at least one monitoring instruction into a control program of the industrial robot comprises executing at least an insertion script by the post processor. According to a further aspect, inserting the at least one monitoring instruction into the control program comprises inserting at least one H function and at least one M function into the control program.

In the above indicated aspect the control program comprises a NC program in form of G code according to DIN 66025. The G function of the G code describes incremental movements of the coordinate axes, i.e. one or several axes of the IR. The M function or the H function describes action codes. These functions can be used for setting or synchronizing a monitoring system of a processing process executed by an industrial robot.

According to a further aspect, inserting at least one instruction comprises inserting at least one H function and/or at least one M function at the beginning of a processing process and reversing the at least one H function and/or the at least one M function at the end of the processing process step.

According to another aspect, an extension or a user defined setting of the CAM program is unambiguously associated with at least one monitoring instruction for inserting into the control program.

By means of the unambiguous association, settings of the monitoring system of an industrial robot can already completely be fixed in the CAM program. An adaptation of the control program to the industrial robot itself is no longer necessary.

In still another aspect, selecting the at least one monitoring instruction is done using a second library which unambiguously associates an extension and/or a user defined setting of the CAM program to at least one monitoring instruction to be inserted into the control program of the industrial robot.

It is a possibility to deposit extensions and user defined settings of CAM programs in a second library, whereby extensions and user defined settings which describe configuration data of a monitoring function or a monitoring system of a tool system are mapped into monitoring instructions of control programs for industrial robots. In an application example, an analysis script identifies an extension in a corresponding tool path of a CAM program and communicates the identification of the extension to an insertion script. The insertion script selects the at least one monitoring instruction from the second library and adds it in the control program. Additionally or alternatively the analysis script recognizes a user defined setting available in a tool path of the CAM program and the insertion script selects from the second library the associated monitoring instruction(s) and adds them in the control program for the industrial robot.

According to an alternative aspect, determining the at least one monitoring instruction takes place by an external application program.

An external application program, as for example a direct link library (DLL), calculates the monitoring instruction(s) associated with an extension and provides them to the post processor of the CAM system. The application program can be executed by a processor of the CAM system or can run in a processor of a different computer system.

According to a further aspect, the at least one monitoring instruction instructs the monitoring system to determine settings of the monitoring system from instructions of the control program and/or from parameter values which are communicated with the at least one monitoring instruction.

In the aspects indicated up to now, the monitoring system obtains its settings or configuration data by means of monitoring instruction(s) inserted in the control program of the industrial robot. Thus, the monitoring system acts as a slave of the control program of the industrial robot. In the alternative application example described in the previous paragraph, the monitoring system by contrast obtains the demand by means of the monitoring instruction to determine its settings for monitoring the processing process by itself using the instructions of the control program directed to the industrial robot and/or the provided parameter values. For this purpose, the monitoring system has a processor which can read and interpret instructions of the control program. Additionally, the monitoring system contains a non-volatile memory to determine the settings of the monitoring system from stored instructions or algorithms.

According to still a further aspect, the at least one monitoring system delivers limiting values for a variation range for at least one quantity used for the monitoring system for monitoring. According to another aspect, the limiting values comprise a fixed lower and/or a fixed upper limiting value or a lower and/or an upper envelope curve.

A beneficial aspect further refers to setting control properties of the monitoring system according to specifications which are communicated by the at least one monitoring instruction to the monitoring system.

On the basis of the obtained specifications, the monitoring system can configure itself in the best way with respect to the processing process to be performed by the industrial robot.

A beneficial aspect further comprises the step of activating tool related settings on the basis of tool numbers which are committed to the monitoring system by the at least one monitoring instruction.

This allows realizing of a tool specific setting of the monitoring system. Thereby, it can be avoided that the monitoring system uses unfavorable measuring quantities or derived quantities for monitoring the processing process.

A beneficial aspect further comprises the step of activating processing specific settings on the basis of the type of processing which is communicated to the monitoring system by the at least one monitoring instruction.

Thereby, the best suited quantity (measured parameter or derived variable) can be used for monitoring a specific processing process, for example a milling process.

In a further beneficial aspect, an apparatus for an automated provision of a monitoring function for a processing process to be performed by an industrial robot comprises: (a) means for analyzing a computer aided manufacturing (CAM) program of the processing process with respect to processing process steps to be monitored using a post processor, and (b) means for inserting at least one monitoring instruction which is executed when performing the processing process into a control program of the industrial robot using the post processor.

According to another aspect, means for analyzing the CAM program and means for inserting the at least one monitoring instruction comprise a processor. According to a further aspect, the processor is arranged in a CAM system. In still another aspect, the processor generates the control program for the industrial robot from the CAM program by executing the post processor.

In a beneficial aspect the above indicated apparatus is operable to execute a method according to one of the above indicated aspects.

Finally, in a specially preferred aspect, a computer program comprises instructions for performing all steps of the methods according to one of the above indicated aspects when the computer program is executed in an apparatus defined above.

SHORT DESCRIPTION OF THE DRAWINGS

The following detailed description describes presently preferred embodiments of the present invention with reference to the accompanying figures, wherein FIG. 1 shows a schematic representation of some components of an industrial robot (IR), a work piece, and a monitoring system according to the prior art;

FIG. 2 schematically illustrates the generation process of a control program for an industrial robot with a connected monitoring system according to the prior art;

FIG. 3 schematically represents a fabrication process for a monitoring system for the IR represented in FIG. 2 according to a method described in the present application;

FIG. 4 reproduces a section of a CAM program in which two program lines have different extensions;

FIG. 4a indicates an example for a macro which constructs the user defined setting PM_adaptive_control for the tool path "1" and activates it by assigning the value "on";

FIG. 5 represents a table which lists extensions for the three features: active control, quality level and alarm behavior;

FIG. 10 represents the portion of the table of FIG. 5 from which extensions for monitoring a previously certified process can be selected (portion which is not framed in black);

FIG. 11 shows the portion of the table of FIG. 5 from which extensions for inserting the monitoring system can be selected if the primary objective for the monitoring of the processing step is minimizing its cycle time (portion which is not framed in black);

Figures 12, 13:
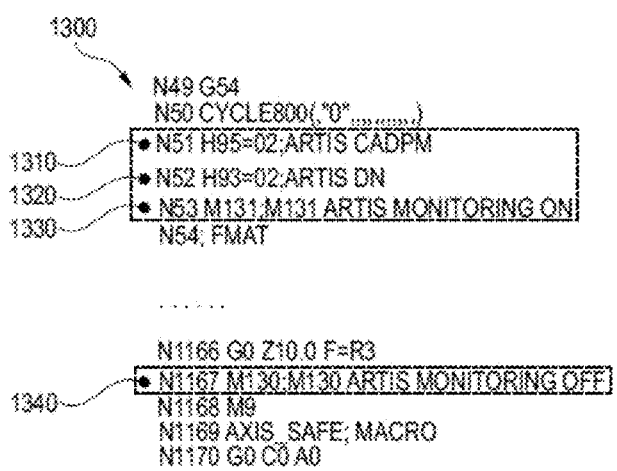

FIG. 12 represents the portion of the table of FIG. 5 from which the extensions can be selected for monitoring a tapping process (portion which is not framed in black); and FIG. 13 shows a section of a control program of an industrial robot into which four program lines with monitoring instructions (highlighted by dashed rectangles) are inserted into the control program by means of an extension with the identifier 02.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In the following presently preferred embodiments of the inventive method and the inventive apparatus for an automated provision of a monitoring system for a processing process executed by an industrial robot (IR) are explained in more detail. These exemplary explanations are described in the context of an industrial robot which has a spindle with a tool as an effector. However, it is also possible that the IR moves a work piece relative to a stationary tool, for example a rotating tool. Apart from an application of the IR as a machine tool, the method described here can further be used for monitoring arbitrary tasks which are executed by an IR.

Figure 1:
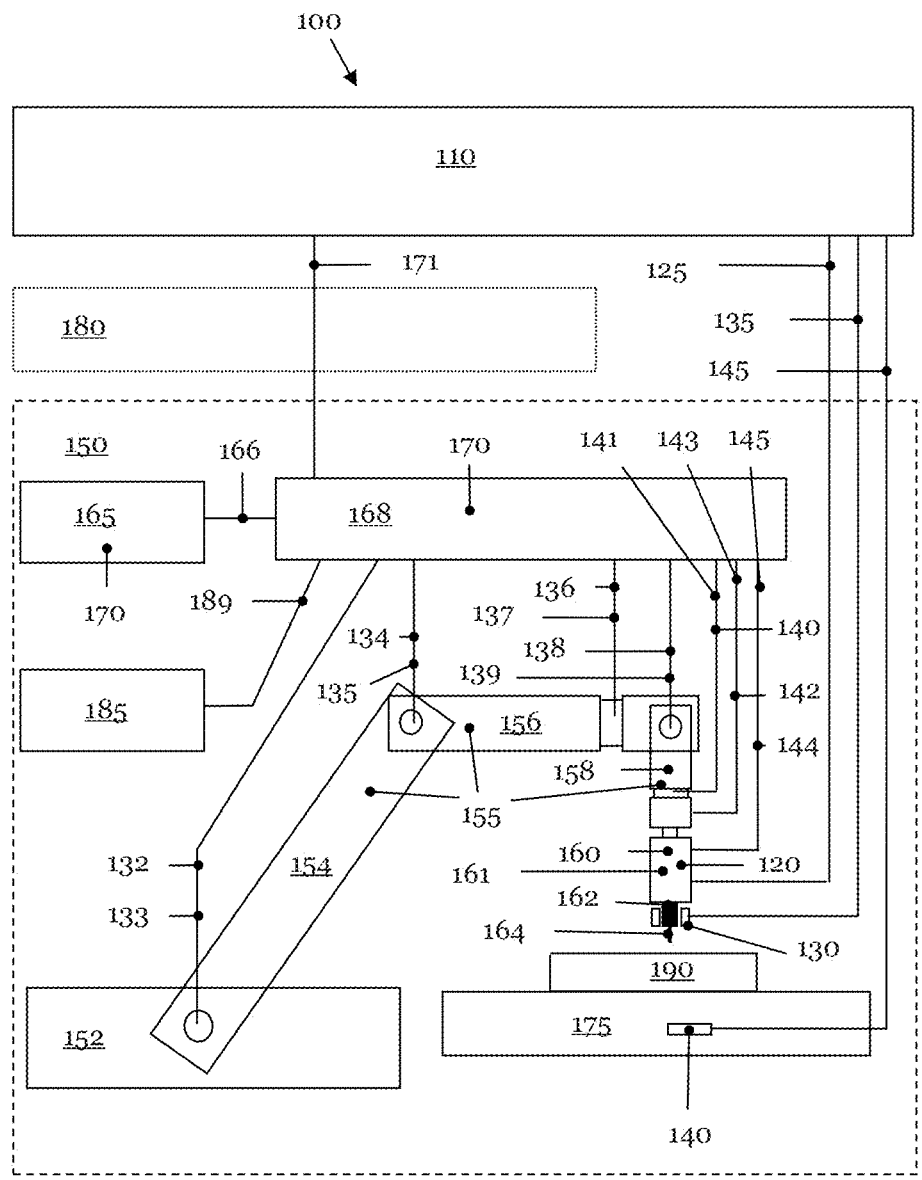

FIG. 1 shows a combination 100 of a monitoring system 110 and some components of an exemplary industrial robot 150. The example of an IR 150 which is represented in FIG. 1 comprises a stationary robot base 152, which is rotatable, a manipulator 155 and an effector 160. In the represented example, the manipulator or the robot arm 155 comprises the members 154, 156 and 158. The individual members 154, 156 and 158 are rotatable against each other. The two members 156 and 158 are additionally rotatable around their longitudinal axes. Furthermore, the members 156 and 158 of the manipulator 155 can be variable in their lengths. In the IR 150 exemplary represented in FIG. 1, the effector 160 has the form of a spindle or a machine spindle 161. The tool holder 162 of the spindle 161 receives a tool 164. In the example represented in FIG. 1, the spindle 161 carries a cutter 164. However, the tool 164 of the IR 150 is not restricted to the application of a cutter 164, rather the tool holder 162 of the spindle 161 can receive any kind of rotating tools 164 as for example drills, polishers, broaching tools, deburring, or thread cutting tools (not shown in FIG. 1). It is also possible that the effector 160 does not have the form of a machine spindle 161 and receives stationary tools (also not shown in FIG. 1).

As already mentioned above, the effector 160 can be operable to receive a work piece 190 and to move the work piece 190 relative to stationary tool during a processing process. Further, it is conceivable that both the work piece 190 by the effector 160 of the IR 150 and the tool are moved during a processing process (not represented in FIG. 1).

The IR 150 has a memory 165 and a processor 168 which can exchange data by means of the connection 166. The memory 165 which is preferably a non-volatile memory stores a control program 170 which is executed by the processor 168 during the operation of the IR 150. An arbitrary processor type can be used as the processor 168; presently often microprocessors are used.

The control program 170 controls the movements of the IR 150. In order that the control program 170 can operate and control the IR 150, the processor 168 is connected with a sensor and an actuator of the robot base 152 via the connections 132 and 133. The robot base of the IR 150 has at least one sensor and one actuator; however, it can also have several sensors and actuators.

In the example represented in FIG. 1, the processor 168 further has connections 134, 135, 136, 137, 138, 139, 140, 141, 142, and 143 to the actuators and sensors of the manipulator 155. The processor 168 or the control program 170 controls the effector 160 by means of the connections 144 and 145. Similar to the robot base 152 of the IR 150 the effector 160 can also have several sensors and actuators. The actuators and sensors of the IR 150 are not represented in FIG. 1. Furthermore, in FIG. 1 a connection to a sensor and an actuator is illustrated as one connection in FIG. 1 for clarity reasons.

For example, actuators can be implemented as electric actuating drives. These are actuated by the control program 170 running in the processor 168 by means of the connections 133, 135, 137, 139, 141, and 143. Other drives for example in form of hydraulic systems can also be used. Both, the sensors of the manipulator 155 and the effector 160 of the IR 150 can be implemented in form of incremental rotary position transducers, interference patterns, or light barrier functions. The sensors which are internal sensors of the industrial robot provide their measurement data to the control program 170 by means of the connections 132, 134, 136, 138, 140, 142, and 144.

In the example represented in FIG. 1, the control program 170 running in the processor 168 controls all feed movements of the tool 164 parallel and perpendicular to the surface of the work piece 190 by means of the connections 132 and 133 of the robot base 152 of the IR 150 and the connections 134, 135, 136, 137, 138, 139, 140, 141, 142, 143, 144, and 145 of the manipulator 155 of the IR 150. In the example of FIG. 1, the control program running in the processor 168 controls the rotational speed of the spindle 161, and thus the tool 164 by means of the connections 144 and 145. A sensor arranged in the spindle 161 reports the actual rotational speed of the spindle 161 or the angular position of the spindle 161 to the control program running in the processor 168 by means of the connection 144. The connections 132, 133, 134, 135, 136, 137, 138 139, 140, 141, 142, 143, 144, and 145 between the processor 168 and the robot base 152, the manipulator 155 and the effector 160 of the IR 150 can be wired or the signal between the components 152, 155, 160 of the IR 150 and the processor 168 can be wirelessly transmitted.

The position of the tool 164 of an IR is defined by means of its tool center point (TCP). The TCP is a reference point which is located at the specific position of the tool 164. The control program 170 compares the target position and the actual position of the TCP and thereby controls the three-dimensional position and the location of the tool 164 with respect to a reference point.

Various methods of online programming (close to the process) or off-line programming (far from the process) can be used for generating control programs of industrial robots. Presently, on-line methods are still predominant in the industry. This kind of programming is carried out on site using so-called "teaching". For this purpose, an operator or a machine operator manually executes the motion sequences of the effector 160 which the effector 160 shall execute during the processing process. The most serious disadvantage of the online programing is that the IR is not available for processing processes during the learning processes.

In the present application an off-line programming method is used which is known as CAD (computer aided design) based programming. For this kind of programming a control program 170 is generated for the IR 150 on the basis of design drawings of the work piece 190 and simulations, as will be explained in the following on the basis of FIGS. 2 and 3 in detail. When using an off-line programming the down times of the learning phase, i.e. during the "teaching", are no longer necessary.

The control program 170 of industrial robots 150 operating as a machine tool presently often has the form of an NC (numeric control) or a computer supported numerical control or a CNC (computerized numeric control) according to DIN 66025. In the following, it is not distinguished between NC and CNC. Details of the CAD based programming are in the following explained when discussing of FIGS. 2 and 3.

Controls of industrial robots which are presently on the market can be separated in three groups: 1. Controls which exclusively use the syntax of DIN 66025 for programming. 2. Controls which typically use vendor specific special commands or high level language elements apart from the normally used syntax of DIN 66025. 3. Controls which can exclusively be programmed by a vendor specific command syntax. All three groups of controls can use the methods described in this application.

The tool 164 is directed to the work piece 190 to be processed which is arranged on a stationary work bench 175. In an alternative embodiment, the work bench 175 can be implemented as being moveable in one or two space directions perpendicular to the work piece 164 by means of drives. All known clamping devices can be used for fixing the work piece 190 on the work bench 175. The defined method does not have any restrictions with respect to the work piece 190 to be processed. Rather, the method described here can be applied to any kind of work pieces 190.

The processor 168 of the IR 150 communicates with the monitoring system 110 by means of the connection 171. Additionally, the IR 150 can optionally be connected to a programmable logic controller (PLC) 180. The PLC is represented as a dotted line in FIG. 1. The PLC 180 often controls the interaction of the IR 150 with the surrounding equipment (not shown in FIG. 1).

The processor 168 can indicate predetermined settings of the control program 170 and data, which it has received from the various components 152, 155, 160 of the IR 150, on a control panel or a control terminal 185 by means of a connection 189. A machine operator starts and stops the IR 150 by means of a keyboard or a touch screen arranged at the control panel 185 (not represented in FIG. 1). Further, the machine operator or a work planner can make changes in a control program 170 running in the processor 168 of the IR by means of the keyboard of the control panel 185, and can thus influence the sequence of the processing process and its monitoring.

In the example illustrated of FIG. 1, the monitoring system 110 has three sensors apart from the IR internal sensors which measure data whereby a processing process which is executed on the industrial robot 150 can be monitored.

The sensor 120 monitors the torque of the spindle 161 and transmits the measured data to the monitoring system 110 by means of the connection 125. As indicated in the introductory part, the sensor 120 can be implemented on the basis of piezo quartzes which are attached on the tool 164.

The sensor 130 measures the feed of the effector 160 or, as in the example of FIG. 1, the spindle 161. The manipulator 155 of the IR 150 performs the feed of the effector 160 or of the spindle 161 perpendicular to the work piece 190. Furthermore, a third sensor 140 arranged on the work bench 175 detects the structure borne noise generated from a processing process (a milling process in the example of FIG. 1).

The sensors 120, 130 and 140 as well as the sensors in the robot base 152, the manipulator 155 and the effector 160 of the IR 150 transmit their measured data to the monitoring system 110 by means of the connections 125, 130, 140, and 171. The connections 125, 135 and 145 between the sensors 120, 130, and 140 and the monitoring system 110 as well as the connection 171 between the monitoring system 110 and the processor 168 can be implemented wired and wireless. If possible, a wireless data transmission is preferred between both the sensor 120, 130, 140 and the sensors of the IR 150 and the monitoring system 110. In this implementation no wires restrict the movements of the various components 152, 155 and 160 of the IR and, on the other hand, connection wires 125, 135, 145, and 171 cannot be damaged or destroyed by the movements of the components 152, 155, and 160 of the IR 150.

In the simplest case, the monitoring system 110 transmits the measured data of the sensors 120, 130, 140 and of the sensors of the components 152, 155 and 160 of the IR 160 to the processor 168 of the IR 150 by means of the connection 171. The control program 170 running in the processor 168 can then cause that all data or a portion of the data is presented to the machine operator of the industrial robot 150 at the control panel 185.

However, the monitoring system 110 normally processes the measured data supplied by the sensors 120, 130, 140 and the sensors of the IR 150. In the simplest case, this is for example a filtering and/or an amplifying of the measured data. On the other hand, it is however often necessary to derive different quantities from the measured data of the sensors 120, 130, 140 and of the sensors of the components 152, 155 and 160 of the IR, which are better suited for the monitoring of a specific processing process. The monitoring system 110 then presents the derived quantities on the control panel 185 for indication using the processor 168 of the IR 150. Often, the quantities characterizing the processing process are presented together with the permitted limiting values (see FIGS. 6 to 9).

When a quantity, which is used for monitoring the processing process, whose numerical value is derived from the measured data of the sensors 120, 130 and 140 as well as of the sensors of the IR 150, exceeds a limiting value, the monitoring system 110 sets off an alarm. An alarm can cause an immediate stop of the IR 150, i.e. in the example of FIG. 1 the rotation of the spindle 110 and the movement of the tool 164 relative to the work piece 190 are immediately stopped, or only the feed motion of the manipulator 155 of the IR are stopped with respect to the work piece 190. Furthermore, an alarm can cause stopping the IR 150 at the end of the processing step or, for example, only indicating a message for the machine operator of the IR 150 at the control terminal 185.

Different from the example represented in FIG. 1, it is also possible that the monitoring system 110 has its own display or its own monitor on which the prepared data of one or several sensors 120, 130, 140 as well as of one or several IR internal sensors are represented in combination with the corresponding limiting values.

Figure 2:
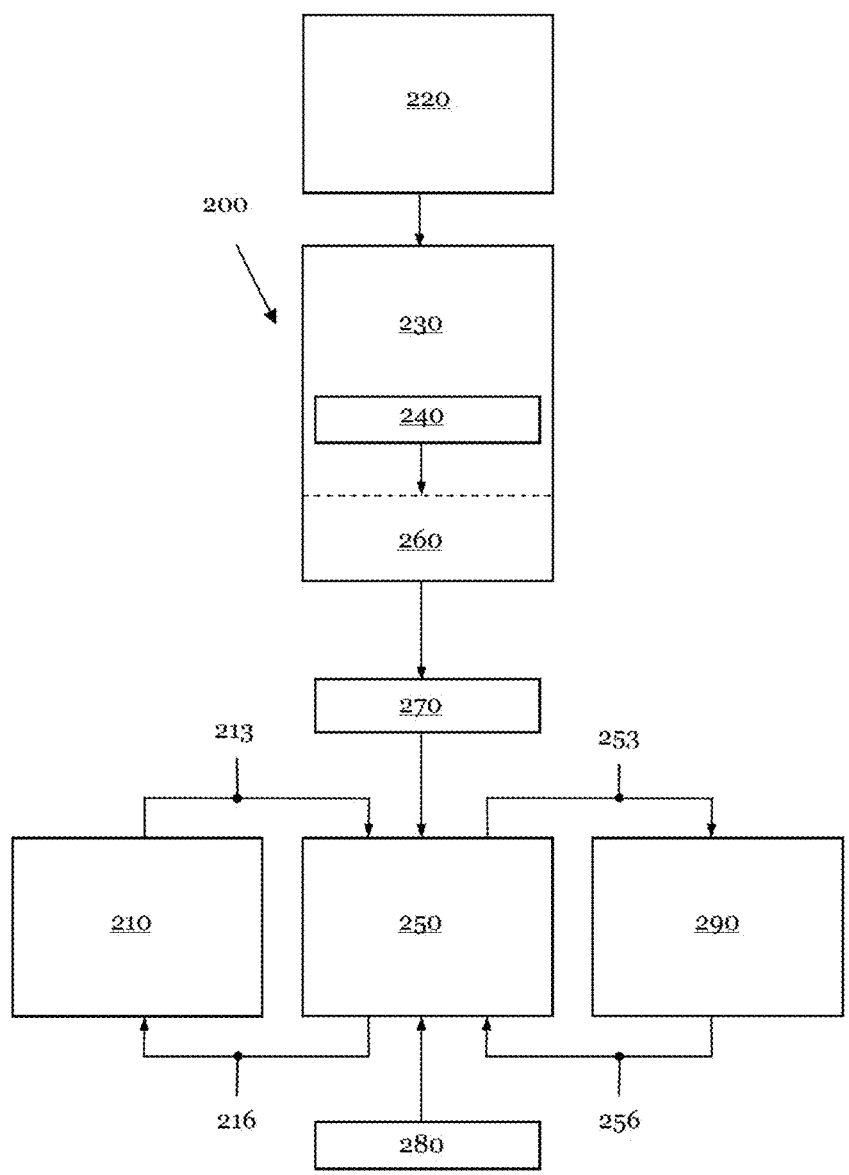

Based on the schematic representation of FIG. 2, the generation process of a control program according the prior art is explained for the combination of an industrial robot 150 and a monitoring system 110 of FIG. 1 in the following. In FIG. 2 the monitoring system has the reference sign 210 and the IR and the processing processes are characterized by the reference sign 250 and 290, respectively.

As already explained in the course of the discussion of FIG. 1, in the example of FIG. 1, the IR 150, 250 outputs a torque and feed force(s) 253 to the processing process 290 by means of the spindle 161. On the other hand, the processing process 290 supplies process forces, as for example one or several torques, one or several space and/or angle coordinates and/or vibrations symbolized by the connection 256 to the sensors 120, 130, 140 as well as to sensors available in the spindle 161 and to the robot base 152, the manipulator 155 and the effector 160 (not indicated in FIGS. 1 and 2). The IR 150, 250 transmits the signals of the sensors 120, 130, 140 and of the IR internal sensors in FIG. 2 to the monitoring system 210 by means of the connection 216. The monitoring system 210 communicates fault conditions to the IR 250 by means of the connection 213.

The process represented in FIG. 2 begins with the generation of a three-dimensional model of a work piece to be fabricated with the help of a computer aided design (CAD) system 220.

The data of the three-dimensional model of the work piece 190 to be fabricated are then generally read in a standardized format, as for example Step or IGES, into a computer aided manufacturing (CAM) system. Then in the CAM system 220 the planning of the processing process 290 which the IR 150, 250 shall afterwards execute is performed by selecting and associating the tools 164 needed for the processing process 290. In this process, CAD data of the work piece 190 to be fabricated which are taken over from the CAD system 220 serve as a planning guide.

The CAM system 230 generates for each tool 164 a corresponding path from the tool tray, the transport of the tool 164 to the operating place at the work piece 190, the actual processing step, as well as the return transport of the tool 164 to the tool tray. Apart from the paths, the CAM system 230 also calculates the velocities with which the various sections of the path movements are passed through. For the actual processing process step at the work piece 190, the CAM system 130 additionally determines the rotational speed of the tool 164 as well as the feed rate(s) of the manipulator 155 of the IR 150. The description of the path movements of all tools 164 including the respective velocities form the CAM program 240 for the work piece 190 to be fabricated.

After generating the CAM program 240 the processing process 290 of the work piece 190 to be fabricated is simulated in the CAM system 230.

After a successful simulation in the CAM system 230, a post processor 260 of the CAM system 230 automatically generates the control program 270 which is to be performed by the processor 168 of the IR 150, 250 from the CAM program 240. As already mentioned, the processor 168 of the IR 150, 250 can perform Computerized Numerical Control (CNC) programs or simply Numerical Control (NC) programs or NC code according DIN 66025. Software specific intermediate stages of the control program 270 which have to be converted in a robot specific language with the help of a parser are no longer necessary.

When necessary, the control program 270 can be stored in the CAM system 230. Before beginning the processing process 290 for the work piece 190, the control program 270 is transmitted from the CAM system 230 to the memory 165 of the IR 150, 250. The machine operator or a work planner responsible for the IR 150, 250 manually inserts one or several instructions 280 or command lines in the control program 270 of the IR 150, 250 which start the monitoring apparatus or the monitoring system 110, 210 when the control program 270 is executed. At the moment, an optional connection to a PLC 180 typically also occurs on-site.

In order that the monitoring system 110, 210 can reasonably provide the monitoring function, it is however necessary to set up or to parameterize the monitoring system 110, 210 with respect to the specific processing process 290 to be performed by the control program 270. For this purpose, respective instructions or command lines 280 which are in the following called monitoring instructions have to be inserted in the control program 270 at one or often at several positions in the control program 270.

However, this is often a difficult adventure in the loud and hectic environment of a production hall in which the operating stuff is sometimes hard pressed for time. But even without time pressure and when ignoring the environment, it is often difficult for the operating stuff of the IR 150, 250 on-site to completely overview the overall processing process 290 for the work piece 190 to be fabricated.

Additionally, it is mandatory for a reliable function of the monitoring system 110, 210 that it is determined which sensor signals have to be included in the monitoring process. A variation interval has to be determined for each signal, wherein a corresponding alarm is set off when the variation interval is exceeded. If a small interval is selected, there is the risk to set off false alarms. If a large allowable variation range is selected, there is the danger that the monitoring system 110, 210 does not detect occurring errors. As a result, the operating stuff at the IR 150, 250 feels over challenged with the setting of the monitoring system 110. Thus, setting or configuring of the operation of the monitoring system 110, 210 for a specific monitoring process 290 remains therefore undone; or the parameterization at least is performed in a non-optimal way. In particular, this happens for very long control programs 270.

Figure 3:
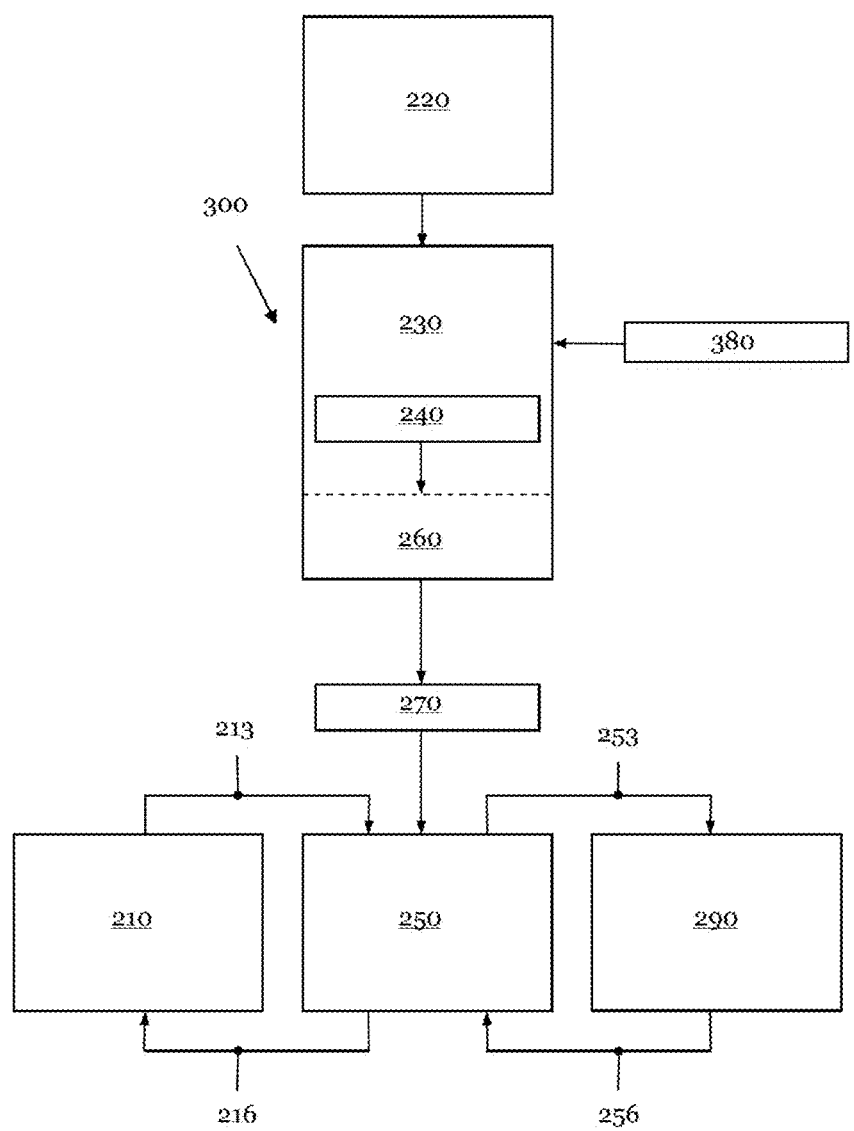

FIG. 3 schematically presents how the present invention removes the disadvantages of the present setting of a monitoring function or of a monitoring system 110, 210. The configuration 300 of FIG. 3 reproduces the configuration 200 of FIG. 2 with the single difference that inserting of the instructions 380 for setting the monitoring system 110, 210 is not executed at the IR 150, 250 itself, but at the CAM system 230.

Hence, implementing the instruction(s) 280 for monitoring the IR 150, 250 is shifted from the manufacturing environment of FIG. 1 to the office environment of the CAM 230. During the discussion of FIG. 2 it has been explained that the movements and the velocities of all tools 164 have to be determined for generating the CAM program 240. In the context of the comprehensive analysis of the processing process 290 it is beneficial to also investigate the monitoring of the processing process 290.

Therefore, the present invention prescribes that the instructions 380 for setting the monitoring system 110, 210 are not inserted into the control program 270, but into the upstream CAM program 240. Then, the post processor 260 automatically generates a control program 270 for the IR 150, 250 which already contains all instructions for a monitoring function which is optimally adapted to the respective processing process 290 from the CAM program 240. At the IR 150, 250 inserting of instructions 280 for the monitoring system 110, 210 is no longer necessary.

Most of the presently used CAM systems enable adding additional instructions or commands into the NC program or into the control program 270 of the IR 150, 250 beyond the pure path movements. The instructions or command lines can manually be inserted in the CAM program 240 or can be generated with the help of one or several scripts and can be inserted in the NC program or the control program 270.

Figure 4:
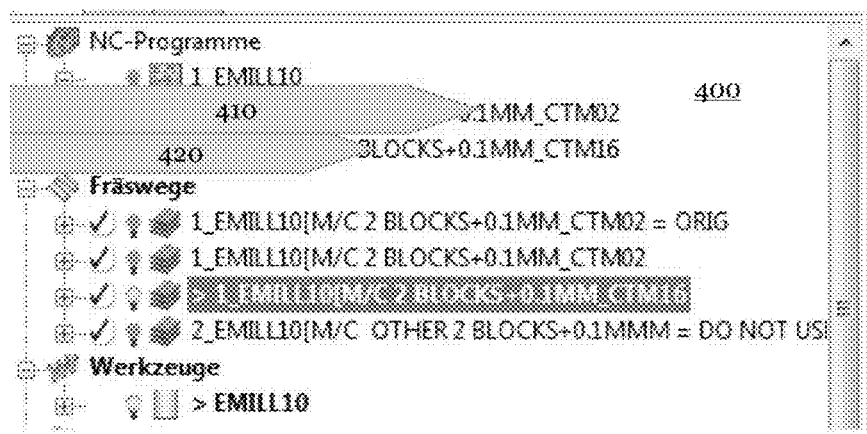
FIG. 4b illustrates a dialog surface of a CAM program in which user defined settings are listed.

Using a short section of a CAM program 400, FIG. 4 exemplary illustrates how instructions for monitoring a processing process 290 can be inserted into a CAM program by the monitoring system 110, 210. The expansions or extensions 410, 420, which indicate in FIG. 4 the identifiers 02 and 16, are identifiers of various instructions inserted in the CAM program 240, 400 for setting the monitoring system 110, 210. In detail, the extensions 410, 420 are added to tool paths of the CAM program 240, 400.

Apart from the extensions 410 and 420 of the CAM program 240, 400 presented in FIG. 4, the instructions for configuring the monitoring system 110, 210 can also be added in form of separate program lines, for example in the form of user defined settings into the respective tool paths of the CAM program 240, 400 (not represented in FIG. 4).

Figure 4A:

FIG. 4a reproduces a macro script 450 which represents how a tool path is automatically externally associated with a new monitoring property. The macro script represented in the example of FIG. 4 constructs the user defined property "PM_Adaptive_Control" and assigns the value "On" to it.

Figure 4B:
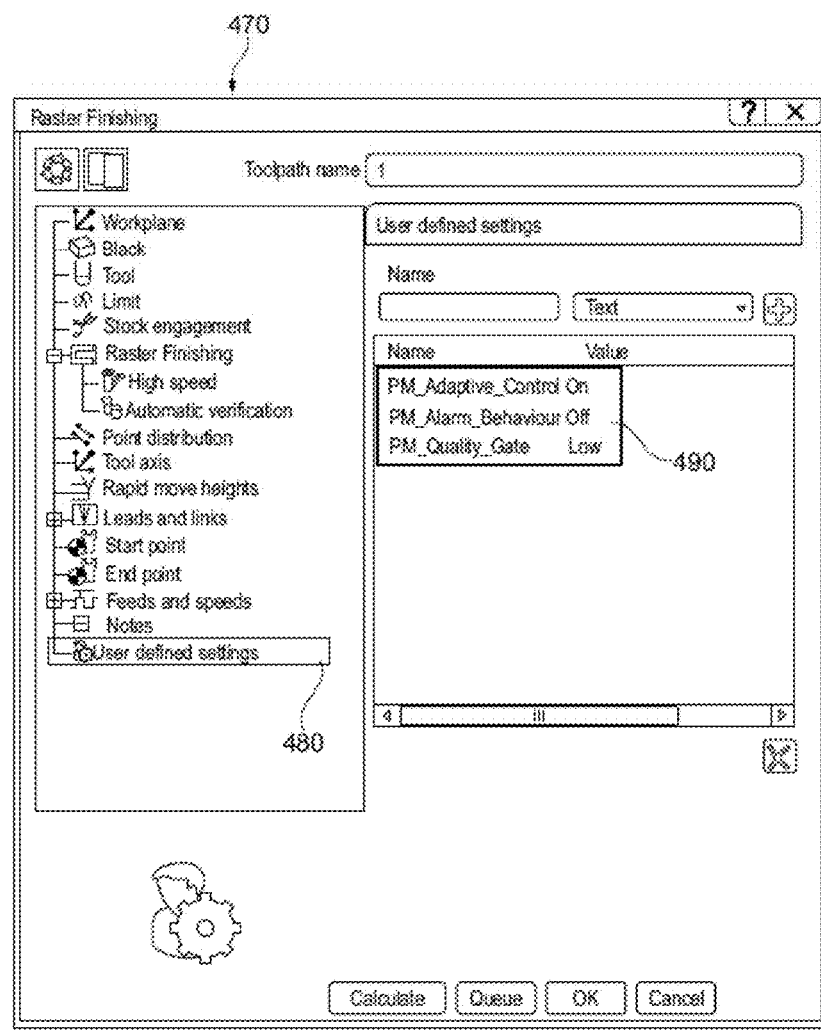

FIG. 4b illustrates how user defined settings can be incorporated in a dialog surface 470 of a CAM program 400. In the example of FIG. 4b, the CAM program 400 comprises a sub-menu 480 User Defined Settings. The sub-menu 480 whose content 490 is represented on the right side of the dialog surface 470 lists the user defined settings "PM_Adaptive_Control", "PM_Alarm_Behaviour" and "PM_Quality_Gate", wherein the first setting is turned on and the second setting is turned off in the represented example. The user defined setting mentioned at the end has the value "Low".

FIG. 5 shows a table in which sixteen further extensions 410, 420 which describe various further examples of configuration settings for the monitoring system 110, 210 are listed apart from the two extensions 410 indicated in FIG. 4 (with the identifier 02) and 420 (with the identifier 16). The in all 18 extensions 410, 420 or identifiers which are listed in the exemplary table of FIG. 5 comprise three different features or classes of features of the monitoring system 110, 210. The feature "alarm behavior" in the right column of the table of FIG. 5 has three different values or reactions to an alarm detected by the monitoring system 110, 210. In the case of an instruction for an immediate stop of the IR 150, 250, the monitoring system 110, 210 causes the processor 168 of the IR 150, 250 to immediately stop the rotation of the spindle 161 as well as the feed movements of the manipulator 155 of the IR 150. In further differentiations of the instruction stop, which are not represented in FIG. 5, for example only the feed movements of the manipulator 155 can be stopped, whereas the spindle 161 continues the rotation of the tool 164. Also not indicated in the table FIG. 5, the characteristics of the alarm behavior stop can further depend from the tool being used, the monitoring process and/or the progress within a processing step of the processing process 290.

The alarm behavior "no stop" means that no alarm reaction is set off. Presently, this behavior is predominantly used as an early warning or for pure demonstration purposes. However, in a future application example, the alarm behavior "no stop" could be used to indicate on a display of the control panel 185 of the IR 150 that the tool 164 being used has reached the end of its life cycle and that is should be replaced after the maximum of N further usages. Furthermore, detecting the alarm behavior "no stop" could for example indicate that a temperature tends towards a predetermined upper limit and/or that the supply of a coolant and/or a lubricant approaches a critical lower limit.

Finally, the occurrence of a delayed stop causes a stop of the IR 150, 250 by the monitoring system 110, 210 at the end of the current processing step or the end of a partial processing step of the processing process 290.

The alarms "delayed stop" and "no stop" represented in the table of FIG. 5 can have different characteristics which for example depend on the tool 164 being used, the kind of the processing step, the progress within a processing step and the work piece 190 to be processed. Therefore, the table indicated in FIG. 5 can only represent a small section of an overall library or of a data base of identifiers or extensions 410, 420 of instructions for configuring the monitoring system 110, 210 for a specific processing process 290.

Figure 6:
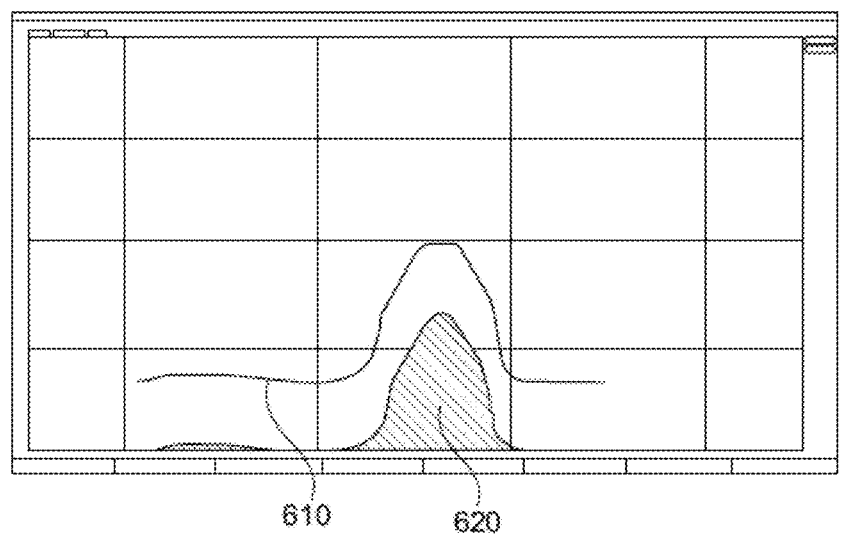
FIG. 6 represents an example of a processing step of a processing process in which the quality level of the monitoring system is set to "low"

The feature "quality level" represented in the third column of the table of FIG. 5 comprises also three different quality stages for a processing step of a processing process 290. FIG. 6 schematically shows a processing step which is executed with the setting of a low quality level. The processing step is monitored with an upper envelope curve 610. The quantity 620 used for monitoring the processing step as for example a torque measured at the spindle 161 by means the sensor 120 has a large margin to the envelope curve 610 at each position. Thus, a larger variation of the height of the torque would also not set off an alarm during the processing step represented in FIG. 6. The behavior of the torque of the spindle 161 represented in FIG. 6 is only an example of a monitored quantity. The quantities determined from the IR internal sensors and the sensors 130 and 140 can, if necessary, also or alternatively be used for monitoring the torque represented in FIG. 6.

Figure 7:
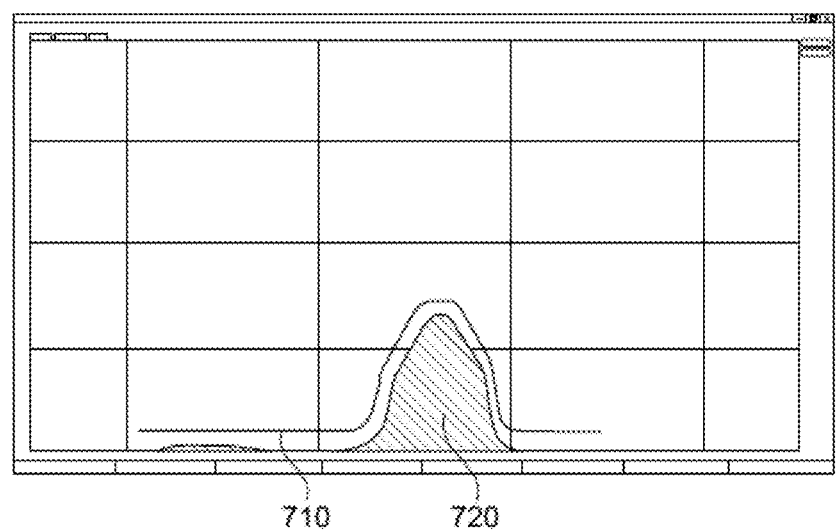
FIG. 7 shows the processing process of FIG. 6 in which the quality level of the monitoring system is set to "high"

FIG. 7 illustrates a processing step for which a high quality level is set up in the monitoring system 110, 210. The upper envelope curve 710 only has a low margin from the quantity 720 used for monitoring the processing step. Since the processing step represented in FIG. 7 follows the expected course, the configuration of the monitoring system 110, 210 with a high quality level does not lead to an alarm situation.

Moreover, the feature "quality level" of the table of FIG. 5 has a mean quality stage which is in between the quality levels shown in FIGS. 6 and 7.

The classification of the feature "quality level" in three stages is only exemplary. It is of course possible to make another classification in more or less levels. As explained above in the example of the alarm behavior, it is also possible that the classification of the feature "quality level" depends on the processing step to be performed, the kind of processing, and/or the work piece 190, just to mention a few examples.

The feature "active control" shown in the second column of the table of FIG. 5 can be turned on or turned off. The condition of active control turned on is in the following also called active adaptive monitoring mode and the condition of active control turned off is in the following also referenced as passive monitoring mode.

Figure 8:
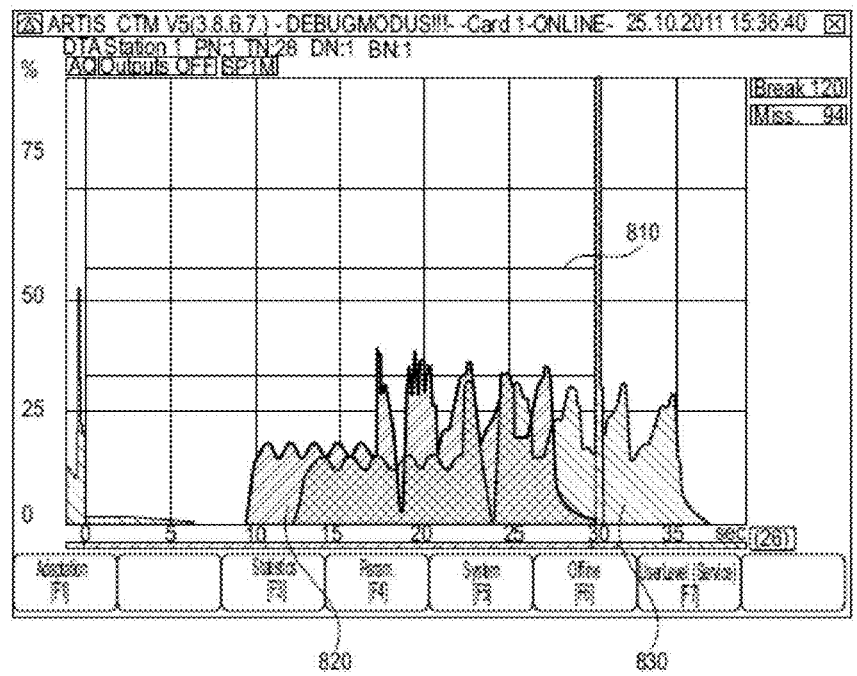
FIG. 8 represents an example of a processing step of a processing process which is performed with activated active control and which is monitored by means of a constant upper limiting value.

FIG. 8 shows an example of a processing step of a processing process 290 for a work piece 190 to be fabricated which has been performed with active control turned on. The processing step is exclusively monitored by a fixed upper limit 810 for which a very high value has been selected. The shapes of the curves 820 and 830 represent two different examples of a quantity used for monitoring which has been recorded during the execution of a processing step. As can be seen from the different starting points and endpoints of the shapes of the curves 820 and 830, the processing step executed in the active adaptive monitoring mode has a shorted cycle time.

Figure 9:
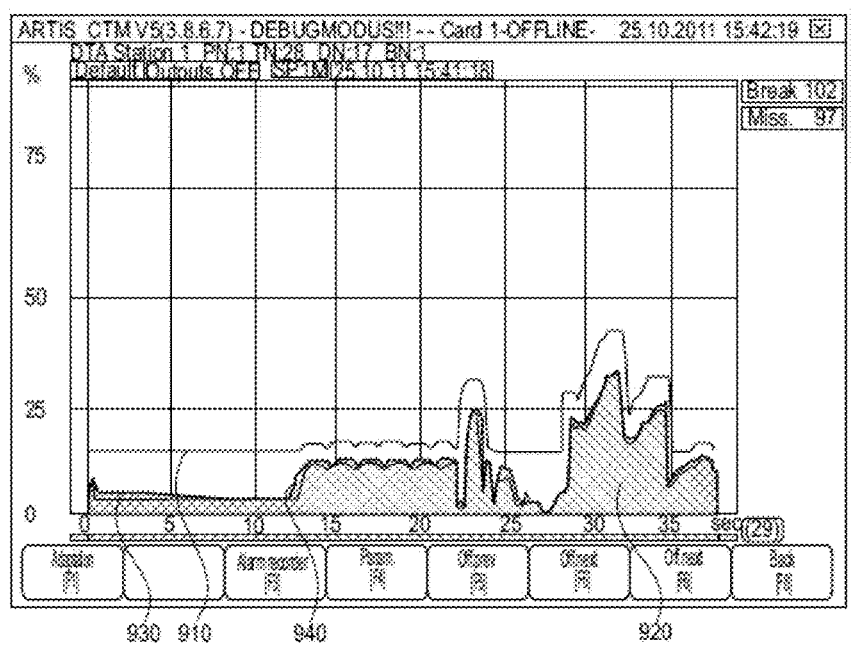
FIG. 9 represents the processing step of FIG. 8 if the active control is turned off and the processing step is monitored with an upper envelope curve and a high quality level.

Similar to FIG. 8, FIG. 9 represents three processing steps of a processing process 290 where the "active control" is turned off, i.e. the passive monitoring mode is turned on. In contrast to FIG. 8, the processing step is furthermore not monitored with a time invariant upper limit 810, but with an upper envelope curve 910 with a high quality level. The processing steps 920, 930 and 940 represented in FIG. 9 only have a minimal variation in time. Furthermore, the height of the quantity used for monitoring has only a low variation for the three shapes of curves 920, 930 and 940 of the repetitions of the processing step.

The active adaptive monitoring mode represented in FIG. 8 and the passive monitoring mode illustrated in FIG. 9 have different objectives. It is the primary objective of the active adaptive monitoring mode to minimize the cycle time of the processing step. For this purpose, larger temporal variations of the quantity used for monitoring are accepted. On the other hand, the passive monitoring mode has the objective to minimize the variation between the individual executions of the monitored processing step. The cycle time of the processing step represented in FIG. 1 is approx. 20% lower compared with the execution of the passive monitoring mode shown in FIG. 9.

There are application fields in which it is not allowed to use the active adaptive monitoring mode for work pieces 190 to be fabricated. The aerospace industry is an example for that. In the aerospace industry a certified process cannot be changed any more. FIG. 10 illustrates how the number of admissible identifiers or extensions 410, 420 of the table represented in FIG. 5 is thereby halved. The identifiers or extensions 410, 420 framed in black with the identifiers 01 to 09 which represent the active adaptive monitoring mode are not allowed in this case.

On the other hand, there exist fields of applications or technology areas which are subjected to enormous economic pressure. In these fields of applications a cycle time which is as low as possible for each individual processing step of the processing process 290 has highest priority. An example for this is the automotive industry. In this case it is necessary to operate with the active adaptive monitoring mode turned on. FIG. 11 symbolizes the portion of the table of FIG. 5—which is outside of the range framed in black—from which the extensions 410, 420 can then still be selected for setting the monitoring system 110, 210.

In the table represented in FIG. 5 the feature "active control" is digital, i.e. it only has two values or conditions. However, it is also possible that each application or application field of the manufactured work piece 190 requires its own identifier of the feature "active control". The number of lines in the table of FIG. 5 would correspondingly be multiplied (not shown in FIG. 5).

Apart from the application field of the manufactured work piece 190, the kind of the processing process 290 influences the configuration of the monitoring system 110, 210. For example, when an error occurs at a thread cutting process which sets off an alarm for an immediate stop of the IR 150, 250, the rotation of the spindle 161 and the feed by the manipulator 155 of the IR 150 may not immediately be stopped. When again starting the rotation of the spindle 161 and its feed for removing the tap from the work piece 190, the tap would break. FIG. 12 shows that thereby a thread cutting process may only be executed with an extension 410, 420 outside of the portion framed in black of the table of FIG. 12, or exclusively with the identifier 18 of the table of FIG. 5.

The table of FIG. 5 has three features wherein two of these features each can have three different values. One feature ("active control") has two values. Thus, the table of FIG. 5 altogether comprises 18 (2×3×3) different combinations of three features. Apart from the three features listed in the table of FIG. 5, however, it may be necessary or desirable to use further quantities for setting up the monitoring system 110, 210. As already addressed with respect to FIG. 12, the kind of processing also has a significant influence on the configuration or the parameterization of the monitoring system 110, 210. Therefore, the kind of processing may be added as an own feature to the table of FIG. 5 (not shown in FIG. 5).

As explained above with respect to the example of FIG. 12, the type of tool may also have effects on the configuration of the monitoring system 110, 210. Moreover, a varying quantity of the tool 164 may necessitate to respectively adapt the monitoring of a processing step. For example, a tactile analysis of a large tool may be suitable for determining an available tool 164, whereas the danger exists of a damage or even of a destruction of a tool 164 when applying this investigation method to a small tool 164. On the other hand, this danger does not exist when using non-contacting analysis methods. Thus, it may be useful to add the type of tool and the tool size as further independent features in the table of FIG. 5 which summarizes the various setting options of the monitoring system 110, 210 in form of extensions 410, 420 for a CAM program 240, 400.

Moreover, the progress within a processing step in the processing process 290 may necessitate changes in the settings of the monitoring system 110, 210. For example, a first rough partial removal of material in a cutting process step may be performed without monitoring or with only a monitoring by means of a fixed upper limit (see FIG. 8). On the other hand, the subsequent partial step for manufacturing a predefined surface contour of the work piece 190 may require a monitoring which already detects a low deviation from a predefined process progress.

As a result, the table of FIG. 5 only represents a small exemplary section from an overall library of setting instructions for setting options of the monitoring system 110, 210.

In a possible sequence for generating a control program 270 for the IR 150, 250 and the connected monitoring system 110, 210, a script or an analysis script which is for example executed by the processor of the CAM system 290 analyzes a CAM program 240, 400 and inserts extensions 410, 420 of the corresponding program lines into the CAM program 240, 400 from a library using the table of FIG. 5.

Parallel or alternatively, the analysis script adds own program lines which describe setting options of the monitoring system 110, 210 into the CAM program 240, 400 (not shown in FIG. 4). The program lines determine user defined settings which are added into the program parts of the CAM program 240, 400 which describe the corresponding tool path.

As schematically represented in FIG. 3, the post processor 260 generates a control program 270 for the IR 150, 250 in an automated manner. Parallel or sequential to the post processor 260, for example an insertion script identifies the extensions 410, 420 of the CAM program 240, 400 and inserts one or several monitoring instructions which configure the monitoring system 110, 210 for the processing process 290 into the control program 270 of the IR 150, 250.

FIG. 13 shows a section of a control program 1300 which refers to the extension 410 of the CAM program 400 of FIG. 4. The significance of the extension 410 with the identifier 02 has been extensively explained above when discussing the table of FIG. 5. In the example of FIG. 13, the extension 410 with the identifier 02 causes the insertion of four machine specific monitoring instructions 1310, 1320, 1330, 1340 into the control program 1300. The monitoring instructions 1310-1340 are highlighted in the program section 1300 of FIG. 13 by dashed rectangles in contrast to the other instructions of the program section 1300 which refer to the control of the machine tool 150, 250.

The monitoring instructions 1310 and 1320 describe instructions of the H function of the NC code which has been generated according to DIN 66025 and which indicates the configuration which is used for monitoring.

The M function M131 of the monitoring instruction 1330 of FIG. 13 turns on the "active control" (see second column of the table of FIG. 5) and the M function of the monitoring instruction 1340 turns off the "active control" at the end of the processing step of the processing process 290.

The assignment of the monitoring instructions 1310, 1320, 1330, 1340 to the extensions 410, 420 (with the identifiers 01 to 18 in the table of FIG. 5) of the CAM program 240, 400 can be stored in a further or a second library which the post processor 260 or an insertion script can access. Alternatively, an application program running on a processor of the CAM system 230 can determine the associated monitoring instructions 1310-1340 from the identified extensions 410, 420 of the CAM program 240, 400. Instead of running on the processor of the CAM system 230, the application program can also be executed on an external processor or computer system. Finally, it is also conceivable to obtain the portion of the monitoring instructions 1310-1340 from a library and determine a second portion by means of an application program as explained above. For example, the application program can be implemented in form a dynamic link library (DLL).

In the application examples a method of the present application for providing a monitoring function of a processing process 290 executed on an industrial robot 150, 250, (which have been described up to now) the monitoring system 110, 210 obtains precise instructions how it has to monitor the individual processing steps of the processing process 290 by means of the monitoring instruction(s) 1310-1340 of the control program 270, 400. According to the monitoring instructions 1310-1340, the monitoring system 110, 210 performs the predetermined settings and then monitors the individual processing steps of the processing process 290.

However, advanced monitoring systems 110, 210 have an own processor and a non-volatile memory (not shown in FIG. 3). Thus, advanced monitoring systems 110, 210 are able to partially determine their settings or configuration data by itself In an alternative embodiment for providing a monitoring function, it is therefore possible to transmit parameter values for setting up the monitoring function as well as the instruction to the monitoring system 110, 210 to analyze the corresponding part of the control program 270, 1300 into the extensions 410, 420 of the CAM program 240, 400. Based on these specifications the monitoring system 110, 210 can determine the corresponding settings for the individual processing steps of the processing process 290 by itself. For example, the instruction 1310-1340 deposited in the control program 270, 1300 which concern to a movement of an axis of the manipulator 150 of the IR 150, 250 (for example a feed movement of the spindle 161 in FIG. 1) can lead to a signal selection of this axis for the monitoring. For this purpose, the post processor 260 translates the extensions 410, 420 of the CAM program 240, 400 in machine specific instructions 1300-1340 of the control program 270, 1300.

For example, the kind of movement of each axis of the manipulator 155 of the IR 150, 250 as for example positive fast (GO), positive slow (Gx), no movement (Gx), negative slow (Gx), and finally negative fast (Go) can be deposited in a mask in the monitoring system 110, 210 and can be used to help to distinguish when analyzing the respective parts of the control program 270, 1300 by the monitoring system 110, 210.

The monitoring system 110, 210 determines a monitoring with large limits for example the fixed upper limit 810 indicated in FIG. 1 from a rough partial processing step (roughing) for the IR 150, 250 arranged in the control program 270, 1300.

Conversely, a corresponding fine partial processing step (finishing) leads to a determination of a monitoring with tight limits by the monitoring system 110, 210 which is exemplary illustrated by the upper envelope curve 710 of FIG. 7 or the upper envelope curve 910 of FIG. 9.

The limits used for monitoring (for example fixed lower and/or fixed upper limits or lower and/or upper envelope curves) can be transmitted as boundary values or as parameter values to the monitoring system 110, 210 using the monitoring instructions 1310-1340. In the last mentioned case, the monitoring system 110, 210 determines the boundary values used for monitoring from the parameter values.

Furthermore, the type of tool being used and the size of the used tool 164 can be transmitted to the monitoring system 110, 210 by means of tool numbers. The kind of processing as well as the progress within a processing step (rough partial processing step versus roughing or fine partial processing step or finishing) can be transmitted to the monitoring system 110, 210 in form a number key.

Moreover, it is possible to transmit the parameters for the regulating properties to the monitoring system 110, 210 by means of extensions 410, 420 of the CAM program 240, 400 and monitoring instructions 1310-1340 inserted in the control program 270, 1300. The monitoring system calculates for the respective processing step of the processing process 290 from these specifications favorable settings, for example on the basis of an algorithm deposited in its memory.

In the example discussed most recently, the monitoring system does not slavishly perform the monitoring instructions 1310-1340, but configures itself to a large extent based on the parameter values transmitted by the monitoring instructions 1310-1340 and by analyzing the control program 270, 1300. As a result, at least a portion of the data stored in the first library or the data determined by the application program can be determined by the monitoring system 110, 210 by itself and has not to be transmitted. Moreover, it is possible to realize each mixed form between the at first described example (the monitoring system 110, 210 executes the monitoring instructions 1310-1340) and the most recently discussed application example (the monitoring system 110, 210 obtains parameter values and configures itself to a large extent based on these values and the control program 270, 1300).

The method for providing a monitoring function presented in the pre-sent description has two important advantages: (i) the settings of the monitoring function occur by experts in the CAM environment instead of setting the monitoring function on site at the industrial robot itself (ii) The defined method enables to a large extent an automated setting of the monitoring function.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for automated provision of a monitoring function for a processing process which is to be performed by an industrial robot, wherein the method comprises the following steps:
   a processor executing a postprocessor to perform:
   a. analyzing a computer aided manufacturing (CAM) program of the processing process, wherein the processing process comprises a plurality of processing steps, and wherein the analyzing identifies a subset of the plurality of processing steps for monitoring operation of the industrial robot utilizing one or more sensors in order to detect operational errors in the industrial robot; and
   b. automatically inserting at least one monitoring instruction specific to the identified subset of the plurality of processing steps into the CAM program, and generating a control program for the industrial robot from the CAM program, wherein the at least one monitoring instruction is executed when performing the processing process.

2. The method according to claim 1, wherein analyzing the CAM program comprises executing at least one analysis script by the post processor.

3. The method according to claim 1, wherein, in step a., the post processor evaluates at least one of: extensions of tool paths of the CAM program or user defined settings available in tool paths of the CAM program.

4. The method according to claim 3, wherein the extensions of the tool paths of the CAM program and the user defined settings available in the tool paths of the CAM program refer to at least one of: an operation mode of the monitoring system, a quality setting of the monitoring system, or a generation of an alarm event.

5. The method according to claim 3, wherein the extensions of the tool path of the CAM program or user defined settings available in the tool paths of the CAM program are added from CAD data when generating the CAM program.

6. The method according to claim 3, wherein the extensions of the tool paths of the CAM program or the user defined settings available in the tool paths of the CAM program are selected from a first library.

7. The method according to claim 6, wherein an application field of the manufactured work piece restricts selecting at least one of the extensions of the tool paths of the CAM program from the first library or the user defined settings of the CAM program from the first library.

8. The method according to claim 6, wherein at least one of: a type of processing or a tool restricts selecting the extensions or selecting the user defined settings of the CAM program from the first library.

9. The method according to claim 1, wherein, in step b., inserting the at least one monitoring instruction comprises executing at least one insertion script by the post processor.

10. The method according to claim 1, wherein inserting the at least one monitoring instruction into the control program comprises inserting at least one H function or at least one M function into the control program.

11. The method according to claim 1, wherein each extension of the CAM program is unambiguously associated with at least one monitoring instruction which is to be inserted into the control program of the industrial robot.

12. The method according to claim 1, wherein the at least one monitoring instruction instructs the monitoring system to determine settings of the monitoring system from at least one of: instructions of the control program of the industrial robot or parameter values which are transmitted with the at least one monitoring instruction.

13. The method according to claim 1, wherein the at least one monitoring instruction transfers boundary values for a variation range of a quantity which the monitoring system uses for monitoring or transfers parameter values for determining boundary values from which the monitoring system determines the boundary values.

14. The method according to claim 1, further comprising setting regulating properties of the monitoring system according to specifications which are transmitted to the monitoring system by the at least one monitoring instruction.

15. The method according to claim 1, further comprising the step of activating tool related settings on the basis of tool numbers which are transmitted from the at least one monitoring instruction to the monitoring system.

16. The method according to claim 1, further comprising the step of activating processing specific settings on the basis of the type of processing which are transmitted to the monitoring system by the at least one monitoring instruction.

17. An apparatus for automated provision of a monitoring function for a processing process which is to be performed by an industrial robot comprising:
   a processor configured to execute a postprocessor, the postprocessor configured to:
   a. analyze a computer aided manufacturing (CAM) program of the processing processor, wherein the processing process comprises a plurality of processing steps, and wherein the analyzing identifies a subset of the plurality of processing steps for monitoring operation of the industrial robot utilizing one or more sensors in order to detect operational errors in the industrial robot; and
   b. automatically insert at least one monitoring instruction specific to the identified subset of the plurality of processing steps into the CAM program, and generating a control program for the industrial robot from the CAM program, wherein the at least one monitoring instruction is executed when performing the processing process.

18. The apparatus according to claim 17, wherein to analyze the CAM program, the processor is further configured to:
   execute at least one analysis script.

19. The apparatus according to claim 17, wherein the processor is further configured to:
   evaluate at least one of: extensions of tool paths of the CAM program or user defined settings available in tool paths of the CAM program.

20. A non-transitory computer readable memory medium storing program instructions implementing a postprocessor, wherein the postprocessor is executable by a processor to:
   a. analyze a computer aided manufacturing (CAM) program of a processing process to be performed by an industrial robot, wherein the processing process comprises a plurality of processing steps, and wherein the analyzing identifies a subset of the plurality of processing steps for monitoring operation of the industrial robot utilizing one or more sensors in order to detect operational errors in the industrial robot; and
   b. automatically insert at least one monitoring instruction specific to the identified subset of the plurality of processing steps into the CAM program, and generating a control program for the industrial robot from the CAM program, wherein the at least one monitoring instruction is executed when performing the processing process.

* * * * *